(12) United States Patent
Craig et al.

(10) Patent No.: US 9,073,129 B2
(45) Date of Patent: Jul. 7, 2015

(54) CUTTING TOOL HAVING REPLACEABLE CUTTING INSERT AND REPLACEABLE CUTTING INSERT THEREFORE

(75) Inventors: Karen A. Craig, Greensburg, PA (US); Philip M. Mileca, Ligonier, PA (US)

(73) Assignee: KENNAMETAL INC, Latrobe, PA (US)

( * ) Notice: Subject to any disclaimer, the term of this patent is extended or adjusted under 35 U.S.C. 154(b) by 569 days.

(21) Appl. No.: 13/426,851

(22) Filed: Mar. 22, 2012

(65) Prior Publication Data

US 2013/0251471 A1  Sep. 26, 2013

(51) Int. Cl.
*B23B 29/02* (2006.01)
*B23B 51/02* (2006.01)
*B23B 29/12* (2006.01)

(52) U.S. Cl.
CPC .......... *B23B 51/02* (2013.01); *Y10T 29/49881* (2015.01); *Y10T 408/892* (2015.01); *Y10T 408/89* (2015.01); *B23B 2231/0204* (2013.01); *B23B 2231/02* (2013.01); *B23B 2251/02* (2013.01); *B23B 2260/07* (2013.01); *B23B 2260/138* (2013.01)

(58) Field of Classification Search
CPC .................... B23B 2231/0204; B23B 2251/02
USPC ............... 408/231, 233, 227, 230, 713; 279/8
See application file for complete search history.

(56) References Cited

U.S. PATENT DOCUMENTS

| | | | |
|---|---|---|---|
| 756,339 A * | 4/1904 | Down | 408/233 |
| 1,461,462 A * | 7/1923 | Smith et al. | 408/201 |
| 1,475,514 A * | 11/1923 | Ross | 408/226 |
| 2,303,487 A * | 12/1942 | Miller | 408/200 |
| 2,374,919 A | 5/1945 | Bruseth | |
| 2,501,421 A * | 3/1950 | Stephan | 279/155 |
| 2,704,426 A * | 3/1955 | Macaulay | 451/342 |
| 3,112,117 A * | 11/1963 | Wahlstrom et al. | 279/91 |
| 4,250,777 A | 2/1981 | Sorenson | |
| 4,850,153 A * | 7/1989 | Husted | 451/342 |
| 4,856,944 A * | 8/1989 | Reinauer | 408/59 |
| 4,861,203 A * | 8/1989 | Bassett et al. | 409/136 |
| 5,630,818 A | 5/1997 | Del Rio et al. | |

(Continued)

FOREIGN PATENT DOCUMENTS

| | | | | |
|---|---|---|---|---|
| AT | 502527 A1 * | 4/2007 | | B23B 51/12 |
| DE | 60012766 T2 | 1/2005 | | |

(Continued)

OTHER PUBLICATIONS

German Patent Office, "German Office Action", Oct. 21, 2013, 7 pp. (no English translation available)—Resubmitting.

*Primary Examiner* — Sunil K Singh
*Assistant Examiner* — Ryan Rufo
(74) *Attorney, Agent, or Firm* — Larry R. Meenan

(57) ABSTRACT

A rotary cutting tool includes a replaceable cutting tip having a cutting portion structured to perform cutting operations on a workpiece and a first threaded portion disposed generally opposite the cutting portion. The cutting tool further includes a generally cylindrical tool body disposed about a central longitudinal axis. The tool body has a first end portion adapted to be coupled to a machine tool and an opposite second end portion having a second threaded portion cooperatively engaged to the first threaded portion. The second threaded portion is moveable with respect to the tool body in a manner that selectively couples the cutting tip to the tool body.

5 Claims, 4 Drawing Sheets

(56) References Cited

U.S. PATENT DOCUMENTS

| | | | |
|---|---|---|---|
| 5,961,259 A | 10/1999 | Ziegler | |
| 6,109,152 A * | 8/2000 | Hecht | 82/160 |
| 6,599,050 B1 * | 7/2003 | Sjoo | 403/97 |
| 6,783,308 B2 | 8/2004 | Lindblom | |
| 6,899,495 B2 | 5/2005 | Hansson et al. | |
| 6,971,825 B2 * | 12/2005 | Stojanovski | 409/233 |
| 7,114,892 B2 | 10/2006 | Hansson | |
| 7,134,816 B2 | 11/2006 | Brink | |
| 2002/0021945 A1 * | 2/2002 | Harpaz et al. | 407/53 |
| 2007/0031205 A1 * | 2/2007 | Guy | 409/234 |
| 2008/0247832 A1 * | 10/2008 | Maier et al. | 407/40 |
| 2009/0123240 A1 * | 5/2009 | Borschert et al. | 407/40 |
| 2010/0061820 A1 * | 3/2010 | Haimer | 408/143 |
| 2010/0296881 A1 * | 11/2010 | Huang | 407/47 |
| 2011/0103903 A1 * | 5/2011 | Sture | 407/11 |
| 2012/0121347 A1 * | 5/2012 | Osawa et al. | 408/57 |

FOREIGN PATENT DOCUMENTS

| | | | | |
|---|---|---|---|---|
| DE | 10349334 A1 * | 6/2005 | | B23C 5/00 |
| DE | 29924877 U1 | 7/2006 | | |
| JP | 06170616 A * | 6/1994 | | B23B 29/02 |
| JP | 2004160624 A * | 6/2004 | | B23B 51/06 |

* cited by examiner

CUTTING TOOL HAVING REPLACEABLE CUTTING INSERT AND REPLACEABLE CUTTING INSERT THEREFORE

BACKGROUND

1. Field of the Invention

The invention relates to cutting tools for performing machining operations on a workpiece and, more particularly, to cutting tools having replaceable cutting inserts. The invention further relates to replaceable cutting inserts for use with such tools and methods of securing replaceable cutting tips to a tool body.

2. Background Information

Conventional cutting tools can be of both one-part and multi-part design. Cutting tools of the type that make use of a holder part or tool body, as well as a separate, replaceable cutting part or insert, are especially common and may be of widely varying shapes and consist of, for instance, drilling tools, milling tools, thread cutters, etc. The tool body usually consists of a long narrow shank of a cylindrical basic shape having a first end adapted to be coupled in the chucking mechanism of a machine tool and a second end adapted to securely house the insert.

In modern machine tools, the tool bodies are typically sophisticated and expensive, and thus are designed to be used with replaceable cutting inserts, which constitutes the wearing part of the tools. In other words, it is profitable to manufacture the actual cutting part as a separate, detachable unit, which may be replaced after being worn-out, while the holder part may be used for a longer period of time (usually 10 to 20 exchanges).

In practice, the replaceable cutting insert is entirely or partly manufactured from a hard, wear-resistant material, such as cemented carbide or the like, while the tool body is made of a material having a greater elasticity, e.g. steel.

SUMMARY OF THE INVENTION

As one aspect of the present invention, a rotary cutting tool is provided. The rotary cutting tool includes a generally cylindrical tool body and a replaceable cutting tip. The replaceable cutting tip includes a cutting portion structured to perform cutting operations on a workpiece and a first threaded portion disposed generally opposite the cutting portion. The generally cylindrical tool body is disposed about a central longitudinal axis and includes a first end portion adapted to be coupled to a machine tool and an opposite second end portion having a second threaded portion cooperatively engaged to the first threaded portion of the cutting tip. The second threaded portion is moveable with respect to the tool body in a manner that selectively couples the cutting tip to the tool body.

The first threaded portion may comprise a threaded stud rigidly coupled to, and extending from, the cutting tip and the second threaded portion may comprise a geared nut captively disposed in an axial aperture provided in the second end portion of the tool body.

The tool body may include a changeout aperture disposed in the second end portion, the changeout aperture being structured to receive a changeout tool structured to cooperatively engage the geared nut in a manner such that rotation of the changeout tool within the changeout aperture causes the geared nut to rotate generally about the central longitudinal axis.

The changeout aperture may extend generally transverse to the central longitudinal axis.

The geared nut may be retained in the axial aperture via a spanner nut.

The second end portion of the tool body may comprise a housing and the cutting tip may generally be disposed in the housing.

The housing may comprise a slot disposed generally transverse to the central longitudinal axis.

As another aspect of the invention, a replaceable cutting tip for use in a rotary cutting tool having a generally cylindrical tool body disposed about a central longitudinal axis is provided. The tool body having a first end portion adapted to be coupled to a machine tool and an opposite second end portion having a threaded portion. The replaceable cutting tip includes a cutting portion structured to perform cutting operations on a workpiece and a threaded portion disposed generally opposite the cutting portion and structured to cooperatively engage the threaded portion of the tool body in a manner that selectively couples the cutting tip to the tool body.

The threaded portion of the cutting tip may include a threaded stud rigidly coupled to, and extending from, the cutting tip.

As yet another aspect of the invention, a method of securing a replaceable cutting tip to a tool body is provided. The method comprises: inserting a changeout tool into a changeout aperture disposed in the tool body, aligning a threaded portion of the cutting tip with an axially oriented aperture formed in an end of the tool body, inserting the threaded portion of the cutting tip into the axially oriented aperture, drawing the cutting tip into the tool body by rotating the changeout tool to a predetermined torque setting, and removing the changeout tool from the changeout aperture.

The method may be performed after the tool body has been secured in a chuck mechanism of a machine tool.

These and other objects, features, and characteristics of the present invention, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the invention

BRIEF DESCRIPTION OF THE DRAWINGS

A full understanding of the invention can be gained from the following description of the preferred embodiments when read in conjunction with the accompanying drawings in which.

Figure 1:
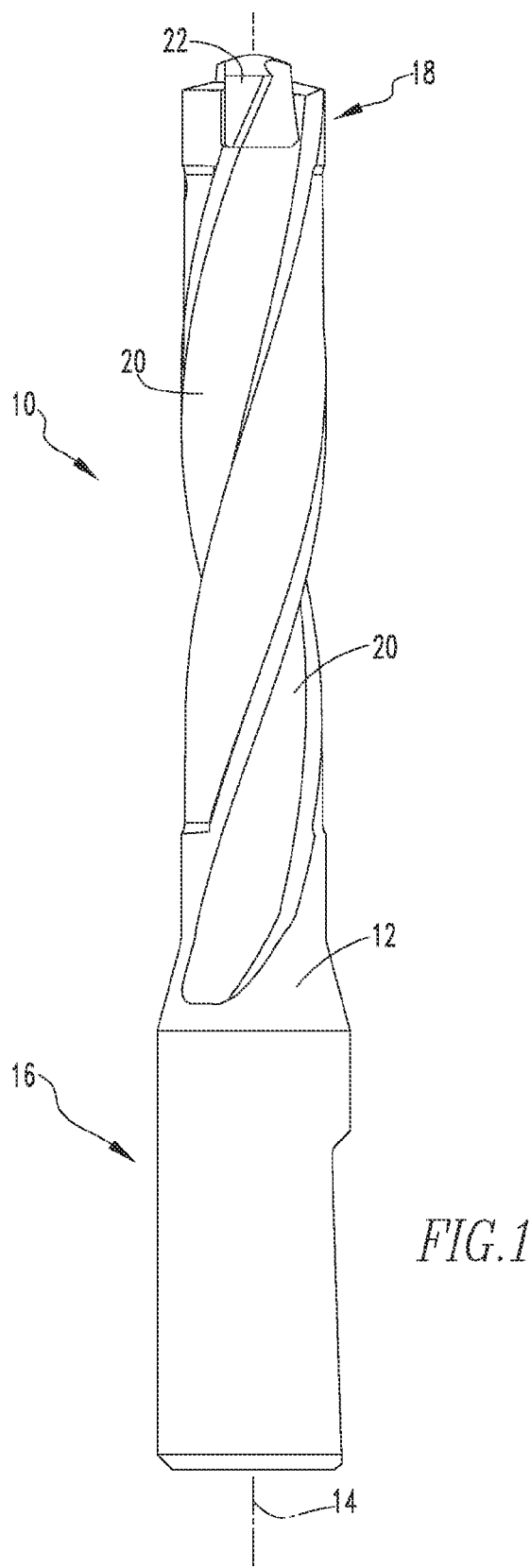
FIG. 1 shows a side elevation view of an example cutting tool in accordance with principles of the present invention.

Parts corresponding to one another are provided with the same designations in all the figures.

DESCRIPTION OF THE PREFERRED EMBODIMENTS

Directional phrases used herein, such as, for example and without limitation, top, bottom, left, right, upper, lower, front, back, and derivatives thereof, relate to the orientation of the elements shown in the drawings and are not limiting upon the claims unless expressly recited therein.

As employed, herein, the statement that two or more parts or components are "coupled" together shall mean that the parts are joined or operate together either directly or through one or more intermediate parts or components.

As employed herein, the statement that two or more parts or components "engage" one another shall mean that the parts exert a force against one another either directly or through one or more intermediate parts or components.

As employed herein, the term "number" shall mean one or an integer greater than one (i.e., a plurality) and the singular form of "a", "an", and "the" include plural referents unless the context clearly indicates otherwise.

FIGS. 1-4 show an example embodiment of a cutting tool 10 in accordance with the principles of the present invention. In the exemplary embodiment shown, cutting tool 10 comprises a drill used for forming cylindrical holes in a workpiece (not shown) when either cutting tool 10 or the workpiece is rotated about an axis. However, it is to be appreciated that the concepts disclosed herein may also be applied to other cutting tools without varying from the scope of the present invention.

Referring to FIG. 1, cutting tool 10 includes a generally cylindrical tool body 12 disposed about a central longitudinal axis 14. Tool body 12 includes a first end portion 16 adapted to be coupled to a machine tool (not shown) and an opposite second end portion 18. Tool body 12 may include a number of flutes 20 formed therein extending generally from second end portion 18 toward first end portion 16. Cutting tool 10 further includes a removable/replaceable cutting tip 22 coupled to second end portion 18 of tool body 12.

Figure 3:
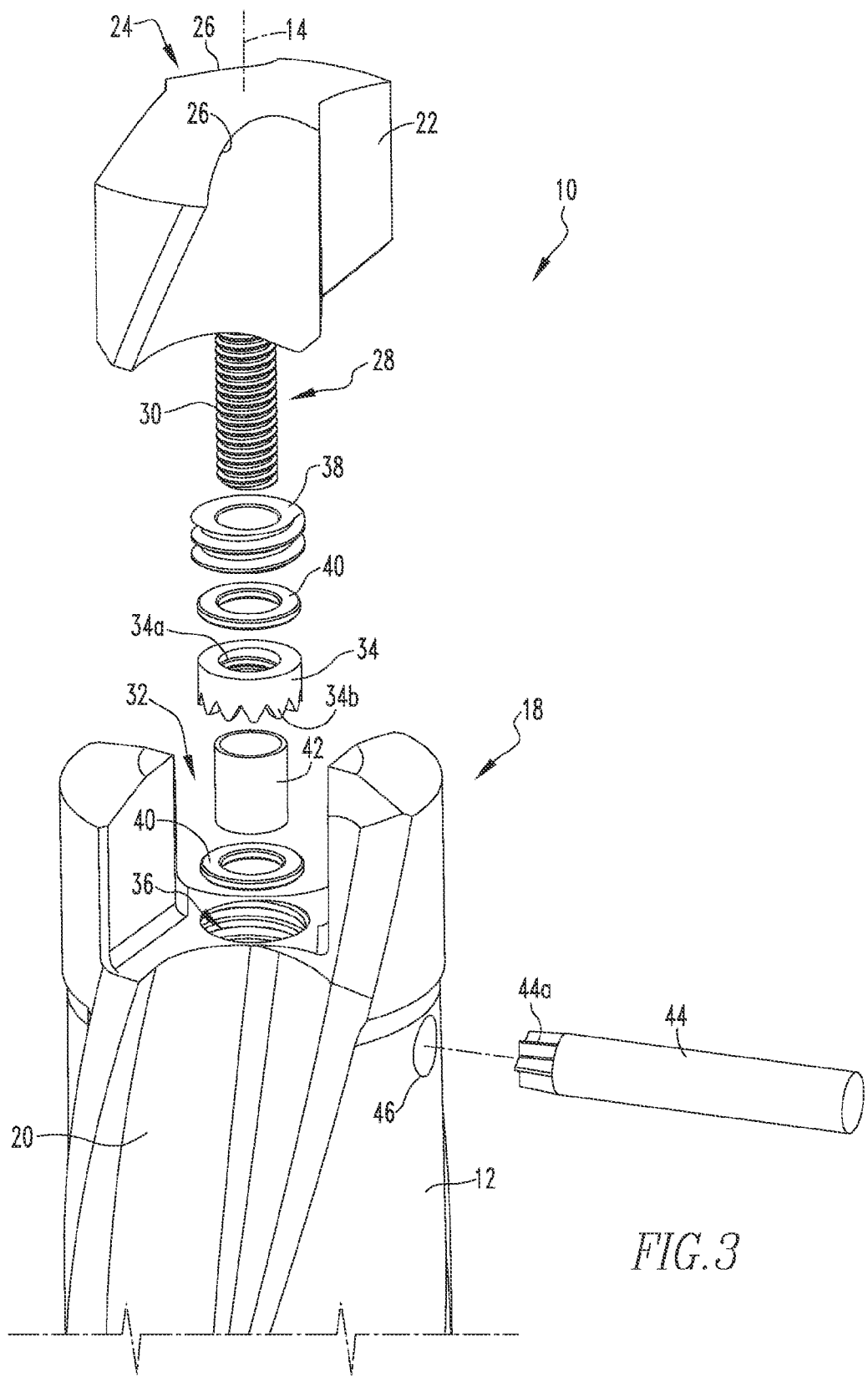
FIG. 3 is an isometric exploded detail view showing components of the cutting tool of FIG. 2.

Referring to FIG. 3, cutting tip 22 includes a cutting portion 24, which includes a number of cutting edges 26 formed thereon, and a first threaded portion 28 disposed generally opposite cutting portion 24. In the illustrated exemplary embodiment, first threaded portion 28 is formed from a threaded stud 30 inserted and rigidly coupled to the main body (not numbered) of cutting tip 12.

Figure 2:
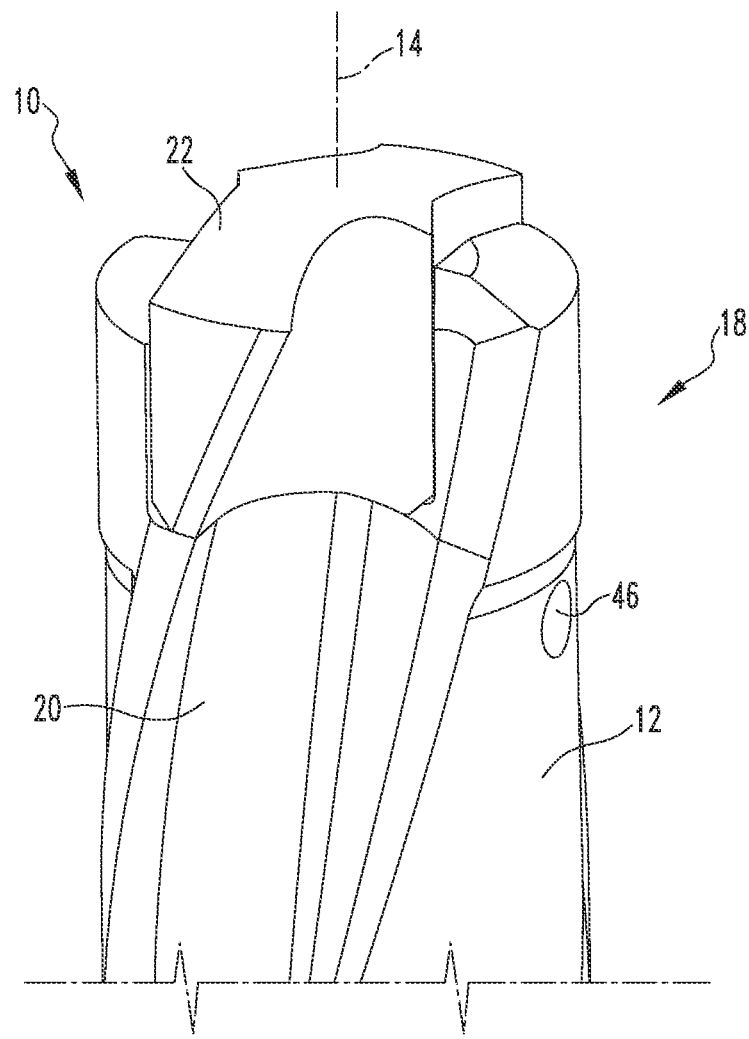
FIG. 2 shows an isometric detail view of the cutting end of the example cutting tool of FIG. 1.
Figure 4:
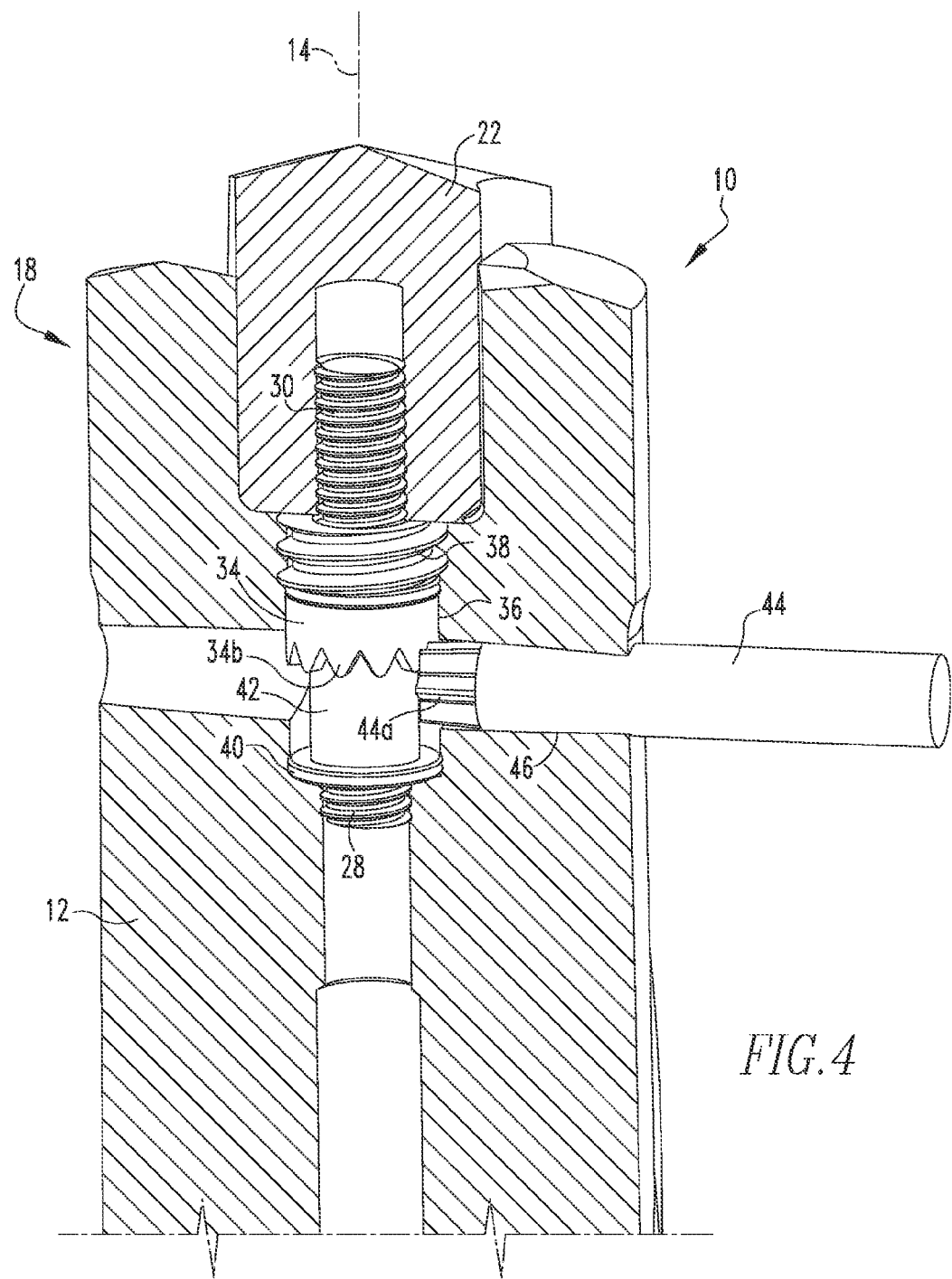
FIG. 4 is a partial cut view of the cutting end of the example cutting tool of FIG. 1 with a portion of the tool body and cutting tip removed to show details of internal components.

Continuing to refer to FIG. 3, second end portion 18 of tool body 12 includes a housing 32 in which cutting tip 22 is generally disposed when coupled to tool body 12, such as shown in FIGS. 1, 2 and 4. Housing 32 engages cutting tip 22 in a manner that acts to secure cutting tip 22 from rotational movement with respect to tool body 12. In the illustrated exemplary embodiment, housing 32 is generally formed as a slot disposed generally transverse to longitudinal axis 14, however, it is to be appreciated that other engagement structures between the tool body and the cutting tip which inhibit rotational movement and thus help to transfer forces between the cutting tip and the tool body may be employed without varying from the scope of the present invention.

In order to secure cutting tip 22 within housing 32, and thus cutting tip 22 to tool body 12, tool body 12 is provided with a threaded portion in the form of a geared nut 34, which is adapted to cooperatively engage the threaded portion 28 of cutting tip 22. Geared nut 34 is provided in an axial aperture 36 formed in second end portion 18 of tool body 12 in a manner such that geared nut 34 may freely rotate within axial aperture 36 about longitudinal axis 14. As shown in FIG. 3, geared nut 34 includes a central threaded portion 34a and a toothed portion 34b disposed on a lower portion (not numbered) thereof, the function of which is described in detail below.

In the illustrated exemplary embodiment, geared nut 34 is retained in axial aperture 36 by a spanner nut 38 having an outer threaded portion (not numbered) which threadedly engages a cooperating portion (not numbered) of axial aperture 36. As also shown in the illustrated exemplary embodiment, a number of washers 40 may be provided adjacent geared nut 34 in order to provide added lubricity assisting in the free rotation of geared nut 34 within axial aperture 36. Additionally, a spacer 42 may also be provided adjacent geared nut 34 in order to limit axial movement of geared nut 34 within axial aperture 36.

As shown in the partial cut view of FIG. 3, during insertion or removal of cutting tip 22 from tool body 12, toothed portion 34b of geared nut 34 is cooperatively engaged by a correspondingly sized toothed portion 44a of a changeout tool 44 (FIGS. 3 and 4) which has been inserted into a changeout aperture 46 formed in second end portion 18 of tool body 12. Subsequent to the engagement of toothed portions 34b and 44a, changeout tool 44 is rotated within changeout aperture 46, which results in the simultaneous rotation of geared nut 34 about longitudinal axis 14 in either a clockwise, or counter-clockwise direction, depending on the direction in which changeout tool 44 is rotated. Through such interaction with changeout tool 44, geared nut 34 may be rotated in a manner such that threaded stud 30 of cutting tip 22 may be threadedly inserted into geared nut 34 and tightened (preferably to a predetermined torque setting), thus securing cutting tip 22 to tool body 12. Conversely, geared nut 34 may be rotated by changeout tool 44 such that threaded stud 30 of cutting tip 22 may be unthreaded from geared nut 34, and thus uncoupled from tool body 12. Once the desired coupling or uncoupling of cutting tip 22 is accomplished, changeout tool 44 is removed from changeout aperture 46.

In the illustrated exemplary embodiment changeout aperture 46 is disposed generally transverse to longitudinal axis 14, however, it is to be appreciated that changeout aperture 46 may be oriented at other angles with respect to the longitudinal axis 14 without varying from the scope of the present invention. It is also to be appreciated that the mechanism as described herein through which cutting tip 22 may be coupled or uncoupled from tool body 12 allows for such coupling or uncoupling of cutting tip 22 to be readily accomplished when tool body 12 is external to, or disposed within, a chuck mechanism of a machine tool. Hence, the present invention can be used to reduce changeout time by allowing cutting tip 22 to be swapped while tool body 12 is coupled in a chuck mechanism of a machine tool.

It is to be appreciated that the present invention provides for a modular cutting tool that is simple to use and requires little to no maintenance. Machine downtime is minimized by allowing cutting insert changes to be quickly made while the tool body is installed on the machine tool. Additionally, the changeout mechanism described herein helps to expedite cutting tip changes by forcing the cutting tip outward from the tool body during untightening and pulling the insert in toward the tool body during tightening.

While specific embodiments of the invention have been described in detail, it will be appreciated by those skilled in the art that various modifications and alternatives to the details provided herein could be developed in light of the overall teachings of the disclosure. Accordingly, the particular arrangements disclosed are meant to be illustrative only and not limiting as to the scope of the invention which is to be given the full breadth of the claims appended and any and all equivalents thereof.

What is claimed is:

1. A rotary cutting tool comprising:

a replaceable cutting tip having a cutting portion structured to perform cutting operations on a workpiece and a first threaded portion disposed generally opposite the cutting portion; and a generally cylindrical tool body disposed about a central longitudinal axis, the tool body having a first end portion adapted to be coupled to a machine tool and an opposite second end portion having a second threaded portion cooperatively engaged to the first threaded portion, wherein the second threaded portion is moveable with respect to the tool body in a manner that selectively couples the cutting tip to the tool body, wherein the first threaded portion comprises a threaded stud rigidly coupled to, and extending from, the cutting tip and the second threaded portion comprises an inward facing central threaded portion of a geared nut captively disposed in an axial aperture provided in the second end portion of the tool body, wherein the second end portion of the tool body comprises a housing, wherein the cutting tip is generally disposed in the housing, and wherein the housing comprises a slot disposed generally transverse to the central longitudinal axis.

2. The rotary cutting tool of claim 1 wherein the tool body includes a changeout aperture disposed in the second end portion, the changeout aperture being structured to receive a changeout tool structured to cooperatively engage the geared nut in a manner such that rotation of the changeout tool within the changeout aperture causes the geared nut to rotate generally about the central longitudinal axis.

3. The rotary cutting tool of claim 2 wherein the changeout aperture extends generally transverse to the central longitudinal axis.

4. The rotary cutting tool of claim 2 wherein the geared nut is retained in the axial aperture via a spanner nut.

5. The rotary cutting tool of claim 1 wherein the inward facing central threaded portion is an integral portion of the geared nut.

* * * * *